SYSTEM FOR RECORDING AND RETRIEVING DIGITAL INFORMATION

Filed Sept. 3, 1963 3 Sheets-Sheet 1

ALL IST ORDER LINES 70-130 C/MM

ALL IST ORDER LINES LESS 120C/MM

ALL IST ORDER LINES LESS 90 C/MM

ROBERT L. LAMBERTS
GEORGE C. HIGGINS
INVENTORS

BY R. Frank Smith
Lloyd F. Seebach
ATTORNEY & AGENT

ROBERT L. LAMBERTS
GEORGE C. HIGGINS
INVENTORS

BY R. Frank Smith
Lloyd F. Seebach
ATTORNEY & AGENT

SYSTEM FOR RECORDING AND RETRIEVING DIGITAL INFORMATION

Filed Sept. 3, 1963 3 Sheets-Sheet 3

ROBERT L. LAMBERTS
GEORGE C. HIGGINS
INVENTORS

BY R. Frank Smith
Lloyd F. Seebach
ATTORNEY & AGENT 3,312,955
Patented Apr. 4, 1967

3,312,955

SYSTEM FOR RECORDING AND RETRIEVING DIGITAL INFORMATION

Robert L. Lamberts and George C. Higgins, Rochester, N.Y., assignors to Eastman Kodak Company, Rochester, N.Y., a corporation of New Jersey Filed Sept. 3, 1963, Ser. No. 306,057
5 Claims. (Cl. 340—173)

The present invention relates to information storage and retrieval, and more particularly to a system and method for converting a combination of electrical signals representative of an item of information into a grating pattern on an optical material, and to a system and method for decoding such a pattern.

In many modern applications of information storage and retrieval, an item of information is represented by a combination of a group of binary "bits." As is well known in the art, in digital information records using the binary system, the presence or absence of a bit indicates one or the other of the two ordinal values ("0" or "1") for each numerical digit appearing in each of a series of predetermined digit positions. Since most physical devices have two distinct states, for example, punched tape or card (hole or no hole), magnetic tape (magnetized or not magnetized area), relays (open or closed), photographic film (exposed or unexposed area), etc., these binary states can be used to indicate the presence or absence of one or more bits, thereby designating different items of information by different combinations of such binary conditions.

It is generally recognized that the theoretical amount of information that can be stored within a given area of photographic film is greater than for many other types of mediums because of the very high resolution available in photosensitive emulsions. However, in any system using photographic film for the storage of information, the amount of information that can be stored per unit area, commonly termed information packing or density, is many orders of magnitude below the theoretical limit. This limitation has arisen from the problem of locating a small area, either mechanically or optically, and because of the possibility of spurious signals being introduced due to dust, dirt and scratches on the film.

In the conventional photographic data recording systems, the absence or presence of a small spot (exposed area) is used to indicate the ordinal value ("0" or "1") of each digit or "bit," each bit being positioned in a predetermined discrete area of the film record member. Therefore, each bit area must be separately scanned and monitored, and it must be large enough to minimize the possible loss or misreading of any particular information bit due to dirt or scratches appearing on the film surface. For this reason, accuracy is achieved in prior art photographic data recording systems by making the code area comparatively large, and since the relatively large area reserved for each particular bit of information could actually hold several more bits of recorded data, this is equivalent to using such smaller bit areas and repeating the same bit of information several times. Thus, in terms understood in the art, it can be said that such prior art systems achieve accuracy only by excessive redundancy. Also, when large code areas are used, the full resolution capabilities of the film are not utilized. In most photographic data recording systems, use is made of no more than a few lines per millimeter resolution, although certain films are capable of resolving over 1,000 lines per millimeter.

An important object of the invention is to provide a system and method of recording items of information on a photographic film which permits more information to be recorded per unit area and a maximum use to be made of the resolving power of the film.

Another object of the invention is to use a composite pattern comprising a sum of individual grating patterns on a photographic film as a record of an item of information.

Still another object of the invention is to convert a combination of electrical signals representing an item of information into a composite pattern comprising a sum of individual grating patterns recorded on a photographic film.

A further object of the invention is to decode a record, which is in the form of a composite optical grating, by photoelectrically converting the angularly diverging beams of first order spectral lines derived from the grating into a group of electrical signals representing the information so recorded.

These and other objects and advantages of the invention will be apparent to those skilled in the art by the description which follows:

As is well known to those skilled in the art, when parallel monochromatic light passes through a diffraction grating and is focused by a lens onto a screen, a central bright image is formed together with bands of light (successive "spectral orders") on either side of it separated by dark spaces. The smaller the grating interval (the more lines per unit length), the more divergent and sharply defined are the spectral orders, but the spectral lines formed by one uniform grating are exactly similar to those formed by another, except as to divergence. It follows that, with a monochromatic light source, the angle of the diverging beam from the grating for each spectral order increases as the grating interval decreases. Therefore, the first order spectral lines for different grating intervals occupy different positions from which their respective grating intervals can be determined for any frequency of source light.

In the present invention, use of the high resolution of photographic film for information recording and retrieval is made by forming an image which can be differentiated from a piece of dirt or a scratch on the film. This is accomplished by exposing the film to a composite pattern which comprises a plurality of uniform gratings with different intervals, each representing the presence of a respective "bit" of the item of information. When the developed image of such a composite pattern is illuminated with monochromatic light, each of the first order spectra that are formed corresponds to a respective one of the uniform grating patterns. Since the composite pattern comprises the sum of the uniform gratings having different grating intervals, the presence or absence of a given first order spectrum can be used to represent the presence or absence of a corresponding binary bit.

Reference is now made to the accompanying drawings wherein like reference numerals designate like parts and wherein.

Figure 1:
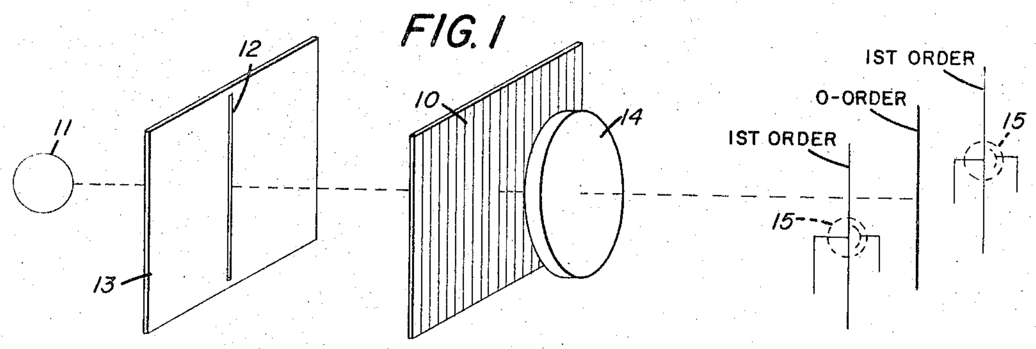
FIG. 1 is a schematic perspective view of an optical system in which a photographic line grating is used as a diffraction grating.

With particular reference to FIG. 1, a photographic line grating 10 can be used as a diffraction grating to provide a zero order spectral line and a first order spectral line. This is accomplished when a monochromatic light source 11 is used to illuminate a slit 12 in a mask or plate 13, the slit being imaged by means of a lens 14 coincident with the zero order line. The photographic grating 10 is placed at the lens aperture so that first and higher order spectral lines are formed alongside the slit image. By placing a photocell 15 in the position of either of the first order lines, it can be determined whether or not there is a particular grating pattern in the lens aperture.

Figure 2:
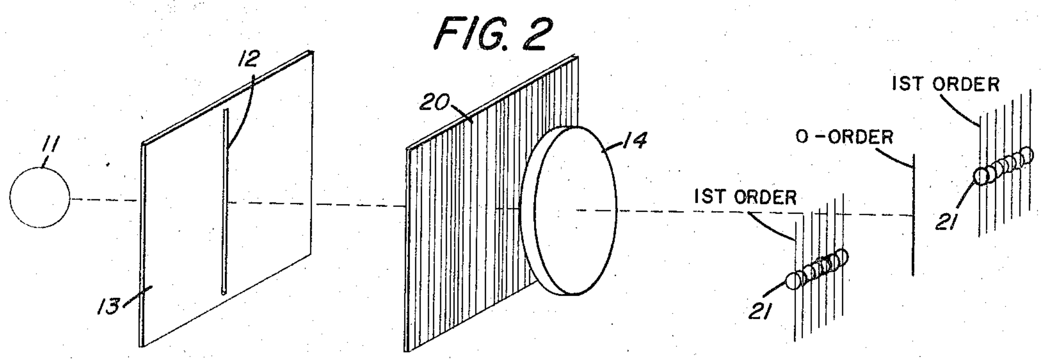
FIG. 2 is a schematic perspective view of an optical system in which a photographic line grating having spatially varying opacity is used as a composite diffraction grating.

A similar system is disclosed in FIG. 2 in which a composite photographic pattern 20 comprises a plurality of grating patterns, each having a unique, uniform grating interval. When the composite pattern 20 is positioned in the lens aperture, a number of first order spectral lines appear which correspond to the number of uniform grating patterns forming the composite pattern. As shown in FIG. 2, a group of photocells 21 can be arranged in the equivalent positions of the first order spectral lines to convert the number of spectral lines formed by pattern 20 into a corresponding number of electrical signals. According to grating theory, the distance from the zero order spectral line, that is, the direct image, to any one of the first order spectral lines is inversely proportional to the grating interval of its respective grating pattern.

In most instances where a binary-six code is used for representation of an item of information, an additional bit is usually recorded with each combination of digital bits as a timing mark. As a result, for this particular code arrangement a maximum of seven bits or a minimum of two bits can be recorded in any one of a variety of combinations representative of a particular item of information. If the ratio of the maximum to the minimum grating interval is less than two, the possibility of second order spectral lines falling in the same position as the first order spectral lines is eliminated. The second order spectral lines can also be eliminated by choosing a group of grating intervals such that the second order spectral lines transmitted thereby lie between the first order spectral lines of other grating intervals in the same group. However, the second order spectral lines are usually not of sufficient brightness to trigger a photocell so as to produce a spurious signal. The first order spectral lines are, therefore, indicative of the grating intervals that have actually been used to form the composite pattern.

Figure 3:
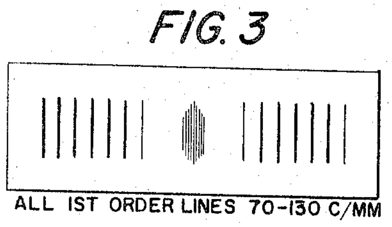
FIGS. 3–5 are representations of a single zero order spectral line and a group of first order spectral lines showing the relation of the first order spectral lines derived from photographic line gratings having different grating intervals.
Figure 4:
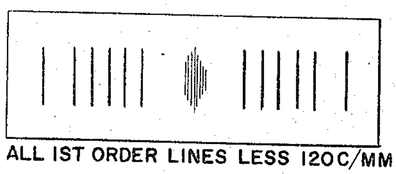
Figure 5:
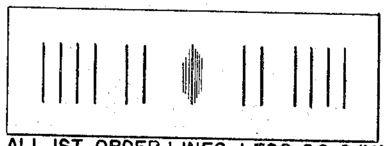

In FIGS. 3–5, as an example, gratings of 70, 80, 90, 100, 110, 120 and 130 lines per millimeter are used, all of which are within an octave. Where the composite pattern comprises seven grating intervals to produce the above, assuming a binary-six code with a timing mark, seven first order spectral lines are formed, as shown in FIG. 3. In FIG. 4, the grating interval for producing the 120 cycle per millimeter line has not been recorded and similarly, in FIG. 5, the grating interval for producing the 90 cycle per millimeter line has not been recorded. Accordingly, any combination of the first order spectral lines can be obtained and are spaced in accordance with the combination of the grating intervals used to form the composite pattern.

Figure 6:
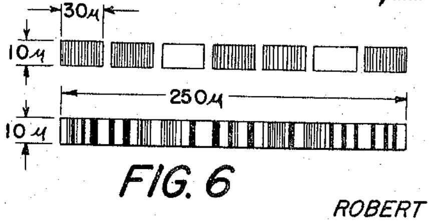
FIG. 6 is a representation of the same item of information encoded on film, in the upper portion of the figure, in the form of discrete bits in accordance with prior art teachings, and in the lower portion of the figure, in accordance with the invention herein in the form of a composite pattern comprising a plurality of grating patterns, each having its own discrete periodic structure.

In FIG. 6, the upper portion thereof shows the placement of clear and opaque code bits such as those which might appear as a digital numeral on one of the prior art photographic data records referred to above. Each particular bit occupies a discrete area of the film, and its presence or absence is indicative of the ordinal value (in a binary system: "0" or "1") for each ordered digit position of a six digit number (plus a seventh bit serving as a timing mark). Although, as noted above, such prior art data recording systems do not permit close packing of bits, the upper portion of FIG. 6 illustrates these prior art bits of a size which would be required if they were recorded (as is possible with present day photographic film) packing about one million ($10^6$) bits per square inch. Since the size of an individual bit is $10\mu$ high and $30\mu$ wide, and since it is necessary to monitor each individual bit, it can be seen that in order to obtain an accurate read out, any variation in film movement must be held to within a few microns, that is, within a few thousandths of a millimeter. The practical difficulty of guiding the film to such tolerances is easily understood. In addition, a scratch or piece of dirt less than one-thousandth of inch wide can completely obliterate or change the reading of a bit.

The lower portion of FIG. 6 shows a corresponding seven-bit numeral stored at the same packing density ($10^6$ bits per square inch) and recorded as a composite grating according to the invention herein. Since the grating extends throughout the entire discrete area allotted to the numeral, and since only a relatively small portion of the over-all width of this composite grating is necessary to produce all of the first order spectral lines referred to above, it can be seen that tolerances for film movement are increased greatly. For the same reason, a scratch or piece of dirt covering even a substantial portion of the composite grating will not obliterate or alter the information, since all of the first order spectral lines will still be formed by the remaining portions of the grating.

Figures 7, 8:
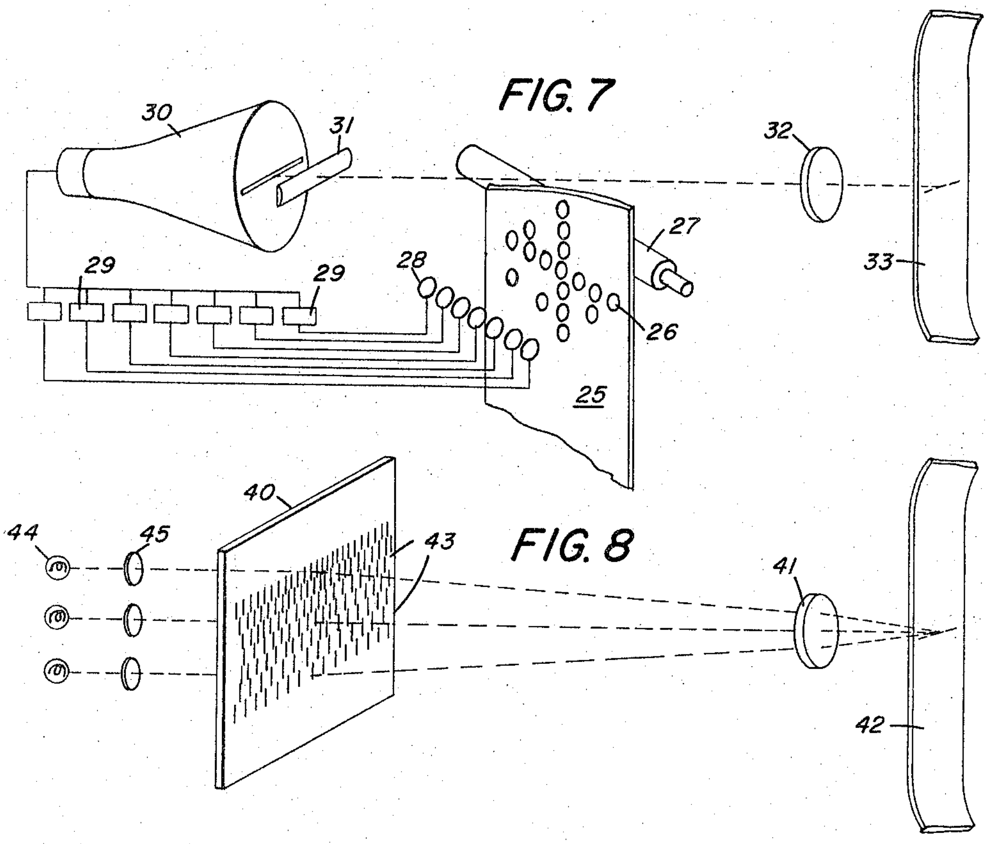
FIGS. 7–9 are perspective views of different systems for recording an item of information on film as a composite pattern comprising a plurality of grating patterns.

With reference to FIG. 7, a system is disclosed herein for recording information by means of a composite pattern. A tape 25, which is perforated with a combination of apertures 26 arranged transversely thereof and representative of an item of information, is moved past a light source 27 and a group of photocells 28. Each of the apertures 26 in a transverse group will transmit light to a corresponding photocell 28 which, in turn, will gate its corresponding oscillator circuit 29 to which the photocell is connected. Each of oscillators 29 provides a series of output signals of a different predetermined frequency. The group of frequencies provided by oscillators 29 can be chosen without regard to second order spectral lines or can be chosen to be within an octave so as to eliminate second order lines as described above. The oscillators are connected to a cathode ray tube 30 so that the intensity of its beam is modulated by the frequency signals derived from the oscillators.

As is well known, information can be presented on the screen of a cathode ray tube by varying the density of the electron beam, which produces a change in the intensity of the spot of light on the face of the tube. If the intensity is made to change in accordance with some intelligence, the result is intensity modulation. Such modulation can be used to produce a series of equally spaced bright spots on the face of the tube which are indicative of equal periods of time. This can be accomplished by applying a cyclically repetitive signal to the cathode ray tube in such a way that the intensity of the trace is increased at regular intervals.

Since the oscillators 29 provide a combination of different frequencies in accordance with those that have been gated, the trace on the face of the tube 30 is a series of bright spots representative of the algebraic sum of the frequencies produced by the gated oscillators. A cylindrical lens 31 is optically aligned with the trace on the face of tube 30 for converting the series of spots to a pattern of lines which, in effect, is a composite grating pattern that is imaged by a lens 32 on a photosensitive medium, such as film strip 33. Depending on the the size of the film used and the size of the image pattern, the film strip 33 can be moved continuously or intermittently in a longitudinal direction in accordance with the size of the pattern, or an optical system can be used which will display a number of such line patterns successively across the film in conjunction with the longitudinal movement of the film. In addition to the system just described, the film strip 33 can be positioned within the cathode ray tube 30 and exposed directly by the electron beam.

When the film is developed, the resulting image is a composite pattern of spatially varying opacity comprising a plurality of grating patterns, each pattern having a unique, uniform grating interval in accordance with the frequency of its respective oscillator. Such a composite grating pattern is illustrated in the lower portion of FIG. 6. It should be obvious to those skilled in the art that oscillators 29 can also be gated by signals derived from information encoded on a magnetic tape, photographic film, punched cards, etc., or by signals derived from a computer or any other signal producing means. If the item of information on the medium from which the signals are derived for gating the oscillators is not compatible with the oscillator frequencies, a matrix circuit can be used to convert such signals to a combination usable by the oscillators.

While all the individual patterns in the composite pattern described above are oriented in the same direction, it is also possible to orient the individual patterns ($\theta$ modulation) so that the first order spectral lines lie in corresponding orientations. With this system, each angular orientation provides a linear position from which the presence or absence of a first order spectral line can be determined so that the oriented composite pattern would not have to be illuminated with monochromatic light. If, as in the above example, seven bits are required for representation of an item of information, then seven angular orientations of the film strip 33 are required. This same principle can be used for composite patterns in order to obtain a greater degree of information packing. In order to produce an oriented composite pattern, the film strip 33 can be rotated through a predetermined angle after exposure to each composite pattern appearing on the face of tube 30, thereby obtaining a number of radially extending composite patterns that are superimposed on each other at the axis of rotation of the film strip. A diffraction pattern as shown in FIG. 10 can be obtained when an oriented composite pattern consisting of four composite patterns, each of which is oriented at a different angle, is illuminated by a point source of illumination, such as a mercury-vapor lamp.

Figures 9, 10:
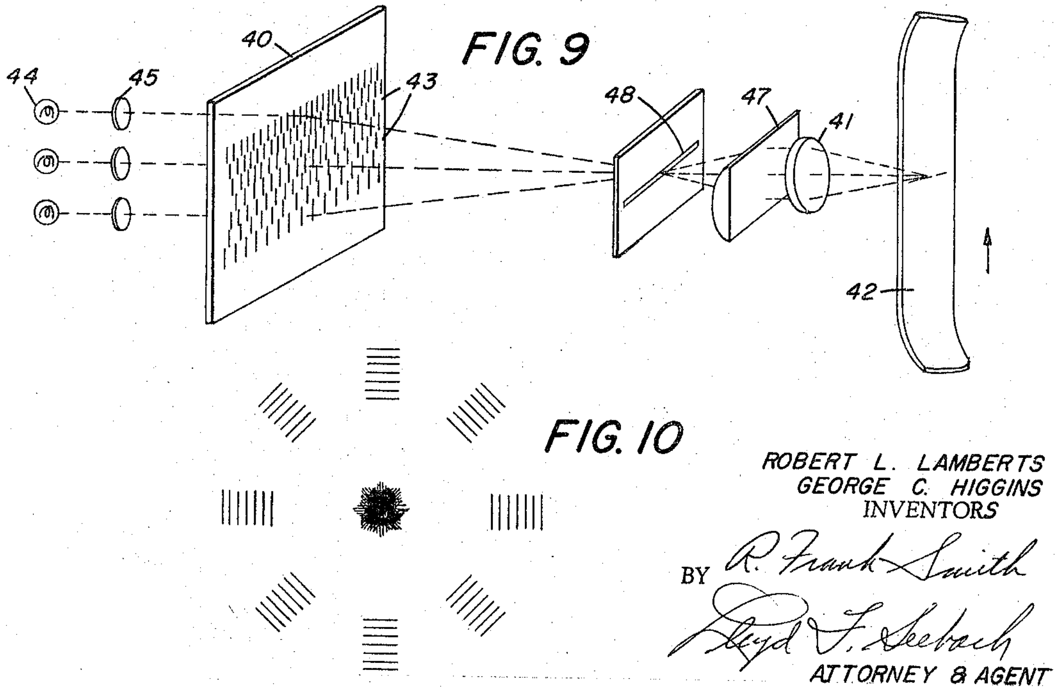
FIG. 10 is a representation of a diffraction pattern that is obtained from an oriented composite pattern illuminated with a monochromatic point source.

In FIGS. 8 and 9, an optical plate 40 which comprises an array of areas having variable transmittance characteristics is imaged by a lens 41 on a film strip 42. The plate 40 comprises an array of a number of gratings 43 having different grating intervals, or a number of members having different sinusoidal cross sections. In either case, each grating or member has a predetermined transmission characteristic such that, when illuminated, it transmits a line pattern of light in which the lines are uniformly spaced. In this arrangement, each grating 43 is illuminated by an individual flash lamp 44 and condenser system 45, only three of which are shown, the lamps 44 being energized by a corresponding photocell which can be arranged in the same manner as shown in FIG. 7 for deriving a signal from each code bit in a punch tape or other medium, or the lamps can be energized by a group of signals transmitted directly thereto from a signal producing means as set forth above. The light passing through any one of gratings 43 emerges as a line pattern of light, the lines being uniformly spaced in accordance with its respective grating. This pattern is imaged and reduced in size by lens 41. Each such pattern can be superimposed on one another by taking advantage of the film movement, whereby the top pattern is exposed first and subsequent exposures are delayed until the film is moved to a position in which the next pattern is imaged. When the latent image on the film is developed, a composite pattern is obtained, which is a plurality of superimposed grating patterns, and has spatially varying opacity. The grating patterns are derived from those of gratings 43 that are actually illuminated.

Instead of accomplishing superposition by use of the film motion, a cylindrical lens 47 and a mask having a slit or aperture 48 can be arranged in the optical system, as shown in FIG. 9. This modification allows all of the patterns formed by any combination of the gratings 43 to be exposed simultaneously. In the azimuth in which the cylindrical lens 47 has no effect, that is, the horizontal azimuth, the test objects 43 are formed on the film 42 by objective lens 41. In the other azimuth, that is, the vertical azimuth, the images of each of the test objects 43 are spread and are all superimposed. For optical efficiency and uniformity, lenses 47 and 41 image the slit 48 onto the film in the vertical azimuth and lens 47 images the test objects 43 into the aperture of lens 41 in the same azimuth. Since the gratings 43 are not in sharp focus in a vertical direction, it is possible with this system to use either type of grating, that is, one of variable transmittance or one of variable area. The same result can be attained by light that is reflected from gratings 43 as well as light transmitted through the gratings.

Figure 11:
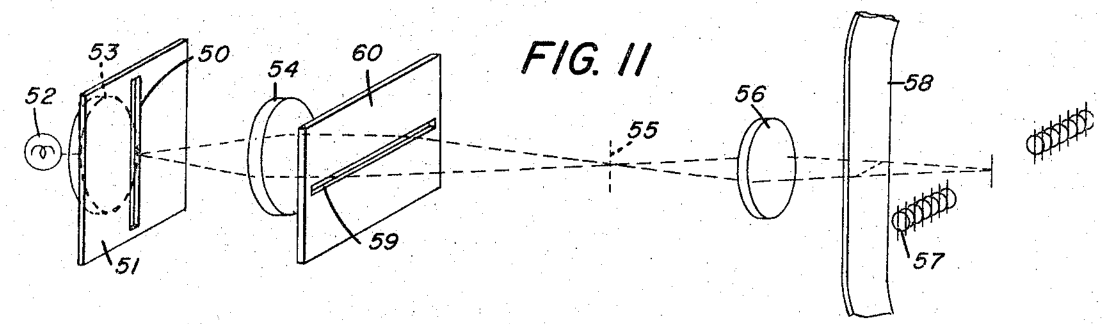
FIG. 11 is a perspective view of an optical system for decoding a composite pattern having spatially varying opacity and recorded on a strip of photographic film.

A system for determining the presence of the first order spectral lines is shown in FIG. 11. Basically, the presence or absence of first order spectral lines derived from a composite pattern can be determined by placing photocells in the positions of the first order spectral lines as described above and shown in FIGS. 1 and 2. However, for small code areas, it is necessary to provide a system for illuminating only one of the composite patterns on the film at a time. Such a system comprises a slit 50 in a mask or plate 51 which is illuminated by a high-pressure mercury lamp 52, the arc being projected onto the slit 50 by a lens 53. The slit is then imaged by a lens 54 to form a real image 55 in space and this image is then projected by a lens 56 onto a group of photocells 57 that are positioned behind a film strip 58 and in the focal plane of lens 56. The lens 56 also images a slit 59 in a mask or plate 60 onto the film so that the area actually illuminated is a reduced image of the slit 59 and corresponds to the area on the film that is to be decoded. Since the real image 55 cooperates with slit 59 to provide a small source of illumination in the conjugate focal plane of lens 56, a coherent system of illumination for the grating on film 58 is effectively formed, as described hereinbelow. A cylindrical lens, not shown, can be placed behind the film to concentrate the light along the length of the first order lines thereby collecting it more effectively onto the photocells.

Figure 12:
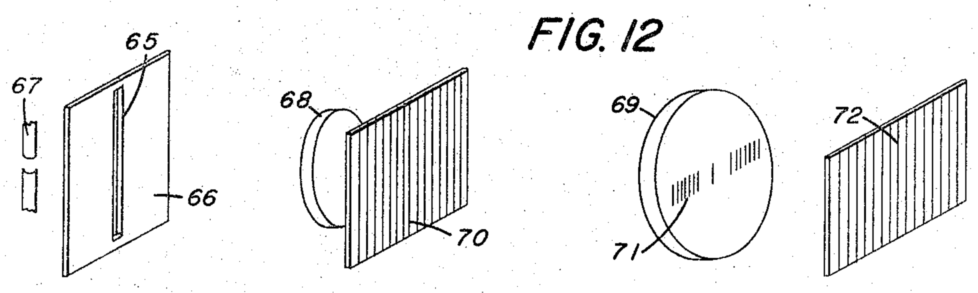
FIG. 12 is a perspective view of a coherently illuminated optical system for producing a composite pattern having spatially varying opacity.

For imaging a composite pattern, there is considerable gain to be achieved in definition and in depth of field tolerances by using coherent illumination rather than the more commonly used incoherent illumination. A simple coherently illuminated optical system is shown in FIG. 12 for producing a composite pattern of a particular combination of grating intervals from a composite pattern comprising the full combination of the same grating intervals. A slit 65 in a mask 66 is illuminated by a point source 67 and the illuminated slit is imaged by a lens 68 in the aperture of an objective lens 69. When a composite pattern 70, comprising the sum of a plurality of grating patterns of seven different grating intervals, is placed directly behind the lens 68, a line spectrum 71 is formed in the aperture of the objective 69 comprising a single zero order spectral line and a group of seven first order spectral lines, as shown in FIG. 12. It can be shown theoretically that when these spectral lines are entirely within the lens aperture, there is no loss in the quality of an image 72 formed by the objective 69, provided the objective is substantially free from aberration. The image 72 that is formed by objective 69 is a reduced replica of the composite pattern 70 which can be imaged on a photosensitive medium. It has been found that acceptable images can be obtained by such a system over a depth of focus of at least .002 in., a depth which definitely exceeds that of a conventional system having the definition required for this type of recording. Since blocking any pair of first order spectral lines in the line spectrum 71 removes the corresponding line pattern from the image 72, any combination of grating intervals can be obtained by appropriately shuttering the first order spectral lines imaged in the objective aperture by means of a shutter responsive to a combination of electrical signals, each of which corresponds to one of the first order spectral lines. It is essential, however, that any shutter that is used must be of such a structure that it does not distort the light waves passing through it.

In the system just described as well as that described above with respect to FIG. 7, the pattern presented by either type of grating 43 or the cathode ray tube 30 produces a diffraction grating pattern on the photosensitive medium or film which is of spatially varying opacity. However, the same systems can also be used to provide a phase grating pattern on a film which is of variable thickness and, when illuminated, produces a corresponding number of first order spectral lines.

Figure 13:
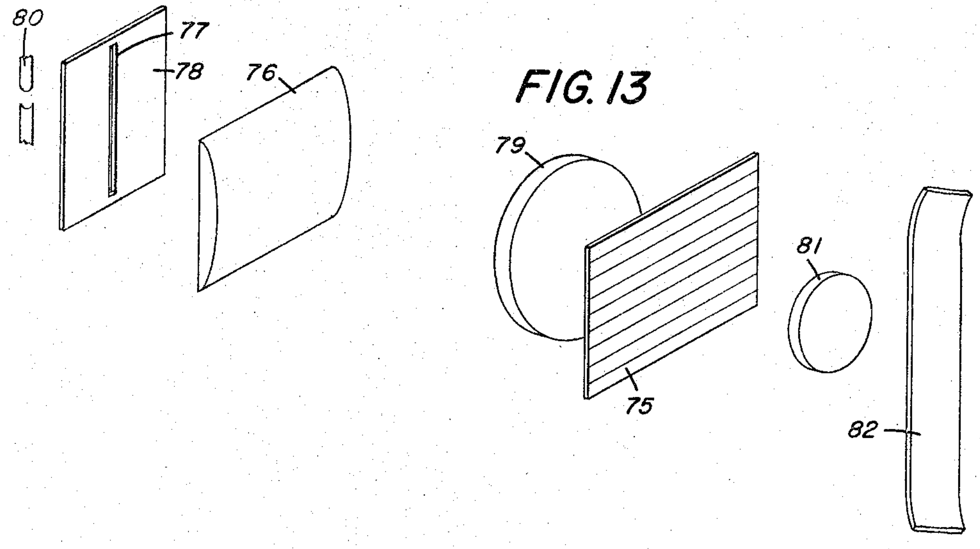
FIG. 13 is a perspective view of another embodiment of the coherently illuminated optical system shown in FIG. 11.

In FIG. 13, a coherent optical system is shown which is a variation of the above-described system shown in FIG. 12 in that a series of individual gratings 75, such as described above with respect to FIGS. 8 and 9 is used, and each of the individual gratings is coherently illuminated. A cylindrical lens 76 is positioned in front of a slit 77 in a mask 78 in such a way that a lens 79 images the slit 77 in one dimension onto the gratings 75, the slit 77 being illuminated by a point source 80. The remaining part of the system can be the same as that shown in FIG. 8 which includes a lens 81 for imaging the gratings 75 on a film strip 82, or can be modified with a second cylindrical lens, as shown in FIG. 9. Since the slit 77 is imaged on the gratings 75, only a portion of the slit illuminates each grating. A series of shutters, not shown, can be placed along the slit 77 to control illumination of any combination of the gratings 75. Because a narrow slit is used, a movement of only a few thousandths of an inch would be required to obscure any one of the gratings 75 so that this shuttering can be done mechanically.

It has been found that an item of information can be stored as a composite pattern comprising the sum of a plurality of grating patterns that are exposed onto a high quality film, each pattern having a unique, uniform grating interval and being individual to one of the bits in the combination representative of the item of information. To read the item of information so recorded on a photographic film, the composite pattern is used as a diffraction grating to form a number of first order spectral lines which correspond to a particular combination of bits representative of the item of information recorded. This system has the advantage that the image corresponding to an item of information is unique and can be distinguished from a piece of dirt or a scratch on the film. Furthermore, since the grating patterns are superimposed, the area occupied by a single item of information is larger than for conventional recording of a single bit. As a result, the problem of locating an area on the film is very much simplified by the system described hereinabove. In certain applications, advantage can be taken of coherent illumination and copies of such a composite pattern can be made by this means with very little loss in image quality.

While the invention has been described with respect to certain embodiments for both recording and measuring the information recorded as a grating, it is to be understood that various changes in the disclosed systems can be made by those skilled in the art without departing from the spirit of the invention. The invention, therefore, is not to be limited to the embodiments disclosed and described herein, but is of a scope as defined by the appended claims.

The embodiments of the invention in which an exclusive property or privilege is claimed are defined as follows:

1. An information record for digital data, said data being in the form of a series of discrete numerical digits, and said series having a predetermined number of digit positions, said record comprising
- a member having formed thereon a composite diffraction grating corresponding to said series,
- said composite grating covering a separate predetermined discrete area of said record member,
- said composite grating comprising a plurality of superimposed gratings,
- and each of said plurality of superimposed component gratings extending substantially throughout said discrete area of said member and having a spatial frequency uniquely indicative of a digit in the associated series which has a particular ordinal value.

2. An information record as in claim 1 in which the spatial frequencies of all such component gratings fall within a single octave.

3. An information record for digital data, said data being in the form of a plurality of series of discrete numerical digits, each series having a predetermined number of digit positions, said record comprising
- a member having formed thereon a composite diffraction grating corresponding to each of said series,
- each of said composite gratings covering a separate predetermined discrete area of said record member,
- each of said composite gratings comprising a plurality of superimposed component gratings,
- and each of said plurality of superimposed component gratings extending substantially throughout said discrete area of said member covered by the composite grating of which it is a part and having a spatial frequency uniquely indicative of a digit in the associated series which has a particular ordinal value.

4. An information record for digital data in the form of a digital numeral having a plurality of discrete numerical bits, each of said bits representing a distinct numerical value, said record comprising
- a member having formed thereon, in a discrete area thereof, a composite diffraction grating corresponding to said digital numeral,
- said composite grating comprising a plurality of component gratings superimposed upon one another,
- and each of said component gratings extending substantially throughout said discrete area and having a spatial frequency uniquely indicative of the numerical value represented by the corresponding one of said bits.

5. An information record for digital data in the form of a plurality of digital numerals having a predetermined series of discrete data bits, each bit of said series corresponding to and representing a selected one of a predetermined plurality of discrete ordinal values, said record comprising a record member having formed thereon, in each of a plurality of discrete areas thereof, a respective composite optical diffraction grating corresponding to each said digital numeral, each said composite grating comprising a plurality of component gratings superimposed upon one another, there being one such component grating corresponding to and having a spatial frequency uniquely indicative of each bit of said series which has a particular one of said ordinal values.

References Cited by the Examiner

UNITED STATES PATENTS 2,813,146 11/1957 Glenn -------------- 340—173

BERNARD KONICK, *Primary Examiner.*

T. W. FEARS, *Assistant Examiner.*